United States Patent
Hustava et al.

(10) Patent No.: US 12,498,478 B2
(45) Date of Patent: Dec. 16, 2025

(54) CLOSE-RANGE COMMUNICATIONS WITH A VEHICLE'S ULTRASONIC PROXIMITY SENSORS

(71) Applicant: SEMICONDUCTOR COMPONENTS INDUSTRIES, LLC, Scottsdale, AZ (US)

(72) Inventors: Marek Hustava, Bratislava (SK); Pavel Kostelnik, Bordovice (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 49 days.

(21) Appl. No.: 18/658,332

(22) Filed: May 8, 2024

(65) Prior Publication Data
US 2025/0102669 A1    Mar. 27, 2025

Related U.S. Application Data

(60) Provisional application No. 63/585,118, filed on Sep. 25, 2023.

(51) Int. Cl.
*G08B 21/00*     (2006.01)
*G01S 15/931*    (2020.01)
(Continued)

(52) U.S. Cl.
CPC ............ *G01S 15/931* (2013.01); *H04B 11/00* (2013.01); *H04R 1/406* (2013.01); *H04R 3/005* (2013.01);
(Continued)

(58) Field of Classification Search
CPC . G01S 15/931; G01S 2015/932; H04B 11/00; H04R 1/406; H04R 3/005;
(Continued)

(56) References Cited

U.S. PATENT DOCUMENTS 8,938,307 B2    1/2015  Boon et al.
9,529,071 B2   12/2016  Shibata et al.
(Continued)

FOREIGN PATENT DOCUMENTS

DE    102009014975 A1 *  9/2010 ............. B60R 25/24
DE    102018109667 A1 * 10/2019 ............. G08G 1/146
(Continued)

OTHER PUBLICATIONS

Marek Hustava, "Sensor Array Module for an Advanced Driver Assistance System," U.S. Appl. No. 18/468,207, filed Sep. 15, 2023, 37 pages.
(Continued)

*Primary Examiner* — Mark S Rushing
(74) *Attorney, Agent, or Firm* — Ramey LLP

(57) ABSTRACT illustrative vehicles, systems, and methods adapt ultrasonic sensing arrays for close-range communication with, e.g., smart devices, parking infrastructure, and other vehicles. As one example, an illustrative vehicle includes: one or more ultrasonic sensors configured for proximity sensing; and a controller configured to use the one or more ultrasonic sensors to receive an acoustic signal from a smart device. As another example, an illustrative vehicle includes one or more microphones configured for at least one of noise cancellation, voice control, emergency vehicle detection, and proximity sensing; and a controller configured to use the one or more microphones to receive an acoustic signal from a smart device, the acoustic signal being in the frequency range between 18 kHz and 25 kHz, inclusive.

10 Claims, 3 Drawing Sheets

(51) Int. Cl.
*H04B 11/00* (2006.01)
*H04R 1/40* (2006.01)
*H04R 3/00* (2006.01)
*H04R 19/04* (2006.01)

(52) U.S. Cl.
CPC ........ *H04R 19/04* (2013.01); *G01S 2015/932* (2013.01); *H04R 2201/003* (2013.01); *H04R 2499/13* (2013.01)

(58) Field of Classification Search
CPC .............. H04R 19/04; H04R 2201/003; H04R 2499/13; B60W 40/02; B60W 2420/54; B60R 25/24; B60R 25/31
USPC .......................................................... 367/93
See application file for complete search history.

(56) References Cited

U.S. PATENT DOCUMENTS

| | | | |
|---|---|---|---|
| 9,709,655 | B2 | 7/2017 | Shibata et al. |
| 9,807,547 | B1 | 10/2017 | Oesterling et al. |
| 9,911,255 | B2 | 3/2018 | Lee |
| 9,912,415 | B2 | 3/2018 | Tsfaty et al. |
| 9,947,153 | B2 | 4/2018 | Bergerhoff et al. |
| 2007/0268783 | A1* | 11/2007 | Okuda .................... G01H 11/08 367/189 |
| 2009/0066499 | A1* | 3/2009 | Bai ......................... G10K 15/02 340/459 |
| 2017/0361806 | A1* | 12/2017 | Scheim .................. H04W 4/023 |
| 2020/0324795 | A1* | 10/2020 | Bojarski ................. G06N 20/20 |
| 2022/0099829 | A1* | 3/2022 | Brown ...................... G01S 5/20 |
| 2022/0225016 | A1* | 7/2022 | Anderson ............ H04R 19/016 |
| 2023/0264628 | A1* | 8/2023 | Kim ....................... G01S 13/865 340/468 |
| 2024/0134041 | A1* | 4/2024 | Dahl ...................... H04R 1/406 |

FOREIGN PATENT DOCUMENTS

| | | | | |
|---|---|---|---|---|
| DE | 102019216996 A1 | * | 5/2021 | ............ B60W 25/24 |
| KR | 910014863 | * | 8/1991 | |

OTHER PUBLICATIONS

Continental, "Digital Access Solutions. More Functions. Continental's smart device based access and start solution," 2024, Retrieved from https://www.continental-automotive.com/en/solutions/access-solutions/digital-access-solution-cosma.html, 12 pages.

* cited by examiner

CLOSE-RANGE COMMUNICATIONS WITH A VEHICLE'S ULTRASONIC PROXIMITY SENSORS

CROSS-REFERENCE TO RELATED APPLICATIONS

The present application claims benefit of Provisional U.S. Application 63/585,118, titled "Ultrasonic Proximity Sensor" and filed 2023 Sep. 25 naming inventor Marek Hustava. The foregoing application is hereby incorporated herein by reference in its entirety.

BACKGROUND

Modern automobiles are equipped with an impressive number and variety of sensors. For example, cars are now routinely equipped with arrays of ultrasonic sensors to monitor distances between the car and any nearby persons, pets, vehicles, or obstacles. Manufacturers continue to create and develop new selling features for their vehicles, often requiring the addition of new sensor types and arrangements to support these new features. The commercial feasibility of these new selling features may depend on the cost and feasibility of integrating the new sensor systems with the existing infrastructure of the vehicle. New selling features may be more desirable if they can leverage the existing infrastructure for additional uses.

SUMMARY

Accordingly, there are disclosed herein illustrative vehicles, systems, and methods that adapt ultrasonic sensing arrays for close-range communication with, e.g., smart devices, parking infrastructure, and other vehicles. As one example, an illustrative vehicle includes: one or more ultrasonic sensors configured for proximity sensing; and a controller configured to use the one or more ultrasonic sensors to receive an acoustic signal from a smart device.

As another example, an illustrative vehicle includes one or more microphones configured for at least one of noise cancellation, voice control, emergency vehicle detection, and proximity sensing; and a controller configured to use the one or more microphones to receive an acoustic signal from a smart device, the acoustic signal being in the frequency range between 18 kHz and 25 kHz, inclusive.

As yet another example, an illustrative method of operating an advanced driver-assistance system (ADAS) includes: performing, via an ultrasonic proximity sensor of the ADAS, an ultrasonic proximity measurement using a first frequency range; and communicating, via the ultrasonic proximity sensor, with a smart device using a second frequency range that is lower than the first frequency range.

As still yet another example, an illustrative vehicle includes: one or more ultrasonic sensors configured for proximity sensing; and a controller configured to use the one or more ultrasonic sensors to transmit data to a second vehicle or an ultrasonic occupancy sensor.

Each of the foregoing examples can be employed individually or in conjunction and may include one or more of the following features in any suitable combination: 1. the acoustic signal comprises at least one of: a lock command, an unlock command, and an alarm command. 2. the acoustic signal is in a frequency range between 18 kHz and 25 kHz, inclusive. 3. the acoustic signal is in a frequency range between 20 kHz and 23 kHz, inclusive. 4. each of the one or more ultrasonic sensors includes a MEMS (micro-electromechanical systems) microphone. 5. the smart device is a smart phone. 6. the controller is further configured to use the one or more ultrasonic sensors to transmit a second acoustic signal to the smart device, the acoustic signal and the second acoustic signal providing a two-way communication channel between the vehicle and the smart device. 7. the controller is further configured to use multiple ones of the one or more ultrasonic sensors to steer a transmitted acoustic signal to the smart device. 8. one or more ultrasonic transducers to transmit a second acoustic signal to the smart device, the acoustic signal and the second acoustic signal providing a two-way communication channel between the vehicle and the smart device. 9. the second frequency range resides within the band between 20 kHz and 23 kHz, inclusive. 10. the controller is further configured to use the one or more ultrasonic sensors to receive data from the second vehicle or the ultrasonic occupancy sensor. 11. the controller is further configured to use multiple ones of the one or more ultrasonic sensors to steer a signal conveying the transmitted data to the second vehicle or ultrasonic occupancy sensor. 12. the transmitted data includes vehicle registration information. 13. the transmitted data includes identification of an owner or driver of the vehicle.

DETAILED DESCRIPTION

The drawings and following description do not limit the disclosure, but on the contrary, they provide the foundation for one of ordinary skill in the art to understand all modifications, equivalents, and alternatives falling within the scope of the claim language. Communications between a vehicle and a smart device are used to provide an explanatory context, but the principles can apply to vehicle communications with infrastructure and other vehicles.

Figure 1:
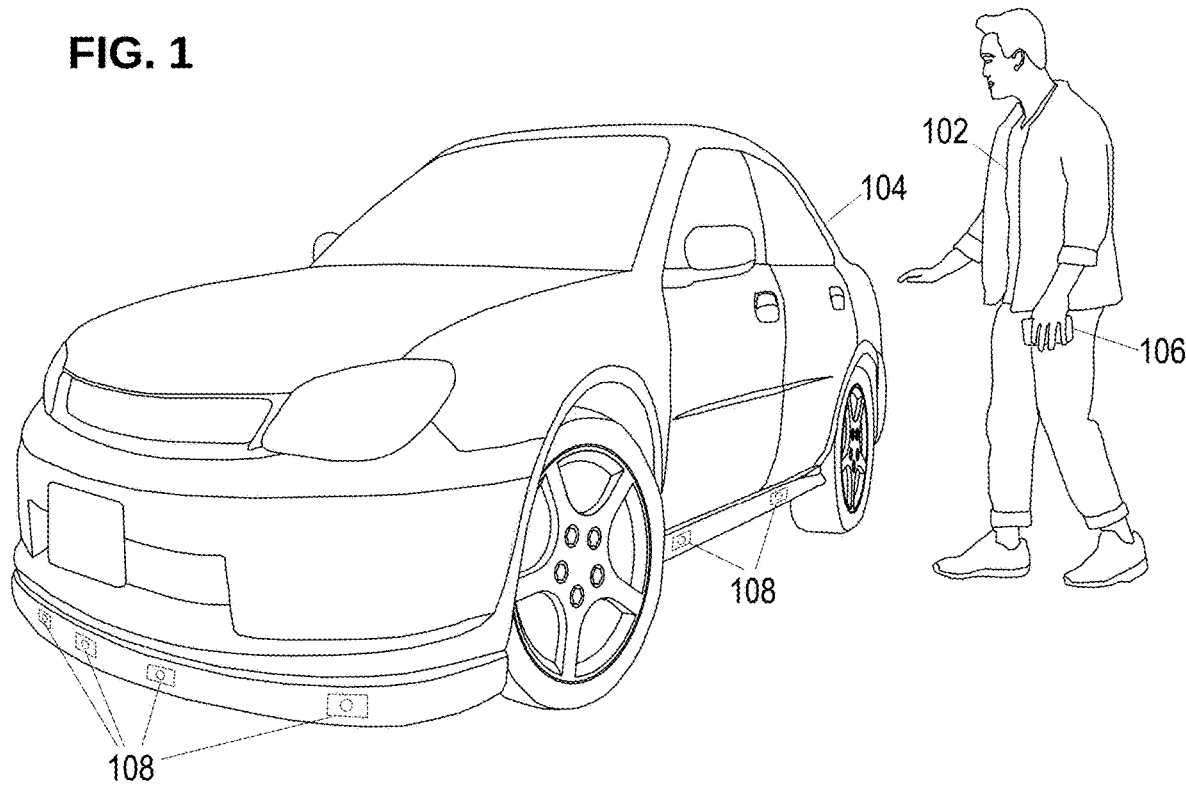
FIG. 1 is a view of a user approaching an illustrative vehicle.

As an illustrative usage context, FIG. 1 shows a user 102 approaching a vehicle 104.

The user 102 has a smart device 106 in their possession as they enter close range, e.g., within two to three meters. The smart device 106 may be a smart phone, smart watch, smart speaker, smart pendant, or any portable or wearable electronic device having a speaker and programmable functionality such as might be provided in the form of a downloadable software application. It is envisioned that the smart device will have wireless connectivity via, e.g., Wi-Fi, the cell service network, or via satellite, to facilitate downloading software and/or remote wireless communications to connect with one or more suitable Internet-accessible servers, but wireless connectivity is not a requirement.

The smart device 106 is preferably a personal item already possessed by the user 102 and habitually kept on their person or in their immediate vicinity. Many suitable smart devices that are commercially available and in widespread use (e.g., smart phones) generate sound or music from a digital data stream having a sampling rate of 44.1 kHz or 48 kHz. While these sampling rates are the most common and will be employed in the following discussion, other sampling rates are in use and may be employed.

Though the average human's hearing range degrades over time, the range of audible sound frequencies is generally taken to be 20 Hz to 20 kHz. Sensitivity decreases at the edges of this range, such that near-ultrasonic frequencies (e.g., 18 kHz to 20 kHz) may be detectable but unobtrusive to most people. Devices employing the 44.1 kHz sampling rate can generate ultrasonic frequencies up to 22.05 kHz, while those employing the 48 kHz sampling range can generate ultrasonic frequencies up to 24 kHz. The present disclosure contemplates using smart devices to generate acoustic signals in the 18 kHz to 25 kHz range, or more preferably in the 20 kHz to 23 kHz range, or even more preferably in the 21 kHz to 22 kHz range.

With a suitable software application, smart device 106 may be configured to generate an ultrasonic or near-ultrasonic signal to communicate with the vehicle 104. The generated acoustic signal may modulate a carrier frequency using amplitude modulation, phase modulation, frequency modulation, or combinations thereof (e.g., quadrature amplitude modulation, frequency-hopping, multicarrier modulation). The generated acoustic signal may additionally or alternatively employ up-chirp and down-chirps to represent channel symbols. The generated acoustic signal may employ a message frame syntax, beginning each frame with a preamble to enable timing synchronization and channel training at the receiver. The frame may include predefined headers, a message payload, and a checksum. Error correction coding may be used to introduce controlled redundancy in the frame contents. A scrambling mask may be applied to the message headers and payload for encryption and "whitening" of the channel spectrum.

In any case, the generated acoustic signal may include a selectable one of, e.g., a lock command, an unlock command, and a sound-alarm command, enabling the smart device 106 to act as a substitute for a traditional car key fob. This arrangement provides various potential advantages as described further below.

As is becoming routine for modern vehicles, illustrative vehicle 104 is equipped with an array of ultrasonic proximity sensors 108. Such sensors typically employ pulse-echo techniques to measure the distance to nearby obstacles around the vehicle. The sensors 108 may include piezoelectric transducers for periodically generating ultrasonic bursts. While these piezoelectric transducers can also detect reflections of the acoustic bursts from nearby obstacles, recent sensor designs employ one or more MEMS (micro-electromechanical systems) microphones to detect the reflections. The ultrasonic proximity sensors 108 may be expected to operate in a 40 kHz to 60 KHz frequency range, but we note here that the MEMS microphones may be expected to operate well down into the audible range (to 10 kHz or below) and may even exhibit peak sensitivity in the 22 kHz to 34 kHz range. Consequently, no hardware modification is needed to make illustrative vehicle 104 sensitive to acoustic signals in the 18 kHz to 25 kHz range. The vehicle may be configured for close-range ultrasonic communication with firmware modifications to the sensors 108 and/or to the vehicle's ECU (electronic control unit). The communication may be, but need not be, unidirectional. Though expectedly tuned for operation in the 40 kHz to 60 KHz range and exhibiting reduced performance outside of this range, the piezoelectric transducers may nevertheless be used to generate close-range acoustic signals in 18 kHz to 25 kHz range with no significant hardware modification. In some contemplated implementations, the vehicle 104 may employ the array of ultrasonic proximity sensors 108 to triangulate the position of user 102 and may then drive multiple transducers in a phased fashion to provide directional gain for, i.e., "steer", the acoustic signals to the smart device 106. Many suitable smart devices 106 include a microphone with a 44.1 KHz or 48 kHz sampling rate, enabling the smart devices to receive ultrasonic or near-ultrasonic signals from the vehicle 104. Preliminary tests with about 2 meters of separation between device 106 and sensor 108 indicate that baud rates of 500 symbols per second up to about 600 symbols per second are readily achievable in each direction.

Figure 2:
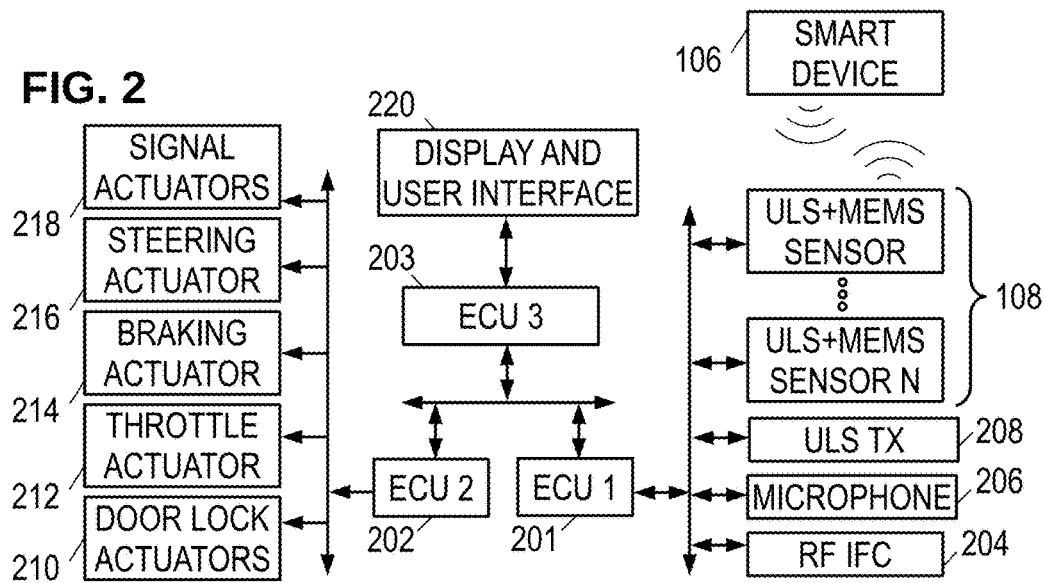
FIG. 2 is a block diagram of an illustrative driving/parking assist system.

FIG. 2 shows a set of interconnected ECUs (electronic control units) 201-203 organized in a hierarchical bus topology. Of course, other topologies including serial, parallel, star, and ring topologies, are also suitable and contemplated for use in accordance with the principles disclosed herein. Though multiple ECUs are shown and described here, in some cases it may be preferred to implement the various functions with a single ECU.

A first ECU 201 is coupled to the array of ultrasonic proximity sensors 108 which may each include a ULS transducers and a MEMS microphone. The first ECU 201 may further be coupled to additional ultrasonic transducers 208 for additional zone coverage and/or acoustic signal gain; additional microphones 206 for, e.g., noise cancellation, siren detection, voice control; and a radio frequency interface 204 for, e.g., cellular network connections, satellite navigation, wireless services.

To provide automated parking or other advanced features, a second ECU 202 may connect to a set of actuators such as door lock actuators 210, a throttle actuator 212, a braking actuator 214, a steering actuator 216, and turn-signal actuators 218. The third ECU 403 may couple to a user-interactive interface 220 to accept user input and provide a display of the various measurements and system status. Using the interface, sensors, and actuators, ECUs 201-203 may provide automated parking, assisted parking, lane-change assistance, obstacle and blind-spot detection, and other desirable features.

FIG. 2 further shows a smart device 106 communicating with an ultrasonic proximity sensor 108, sending and/or receiving ultrasonic or near-ultrasonic acoustic signals. The sensor 108 operating alone or in combination with ECU 201 may parse messages received from the smart device, initiating actions such as locking or unlocking doors.

Figure 3:
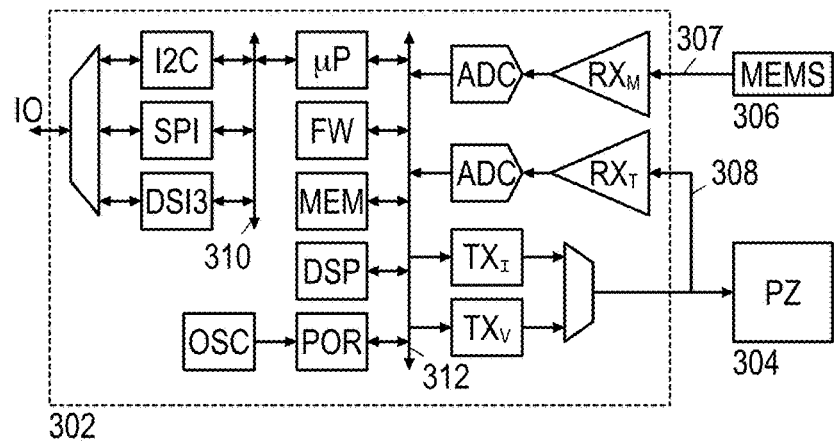
FIG. 3 is a circuit schematic of an illustrative ultrasonic proximity sensor.

FIG. 3 shows a block diagram of an illustrative controller 302 for sensor 108. Controller 302 employs IO (input and output) pins that are multiplexed to a selected one of various IO protocol modules. Modules are shown for the I²C (inter-integrated circuit), SPI (serial peripheral interface), and DSI3 (3rd generation of distributed systems interface) communications bus protocols, but these are just nonlimiting examples. Other contemplated protocols include those set forth in the LIN, CAN, and SENT standards. An IO bus 310 couples the various IO protocol modules to an embedded microprocessor (μP). An AMBA (advanced microcontroller bus architecture) bus such as, e.g., an AHB-Lite (simplified advanced high-performance bus), may be used to couple the embedded microprocessor to various other functional blocks of the sensor controller 302. Such blocks may include, e.g., a nonvolatile firmware (FW) memory, a volatile working memory (MEM), a digital signal processor (DSP), a poweron reset (POR) module, an ADC (analog to digital converter) for a microphone signal receiver ($RX_M$), a second ADC for a transducer signal receiver ($RX_T$), a drive-current transmitter ($TX_I$), and a drive-voltage transmitter ($TX_V$). (The transmitters generate the drive signal for the ultrasonic transducer as a controlled current or controlled voltage, respectively.) A multiplexer may couple a selected one of the transmitters to output pins for driving the piezoelectric transducer 304. FIG. 3 further shows an embedded oscillator (OSC) that generates one or more clock signals for the various other blocks, optionally including a carrier frequency for the transmitters and receivers. The POR module may control distribution of the clock signals to enable a sleep mode for unneeded components and other power saving features.

The IO pins couple the sensor controller 302 directly or indirectly (e.g., via a DSI3 bus master) to an ECU (electronic control unit). The ECU may communicate commands to each of the sensor controllers to, e.g., set values for the sensors' various configuration parameters, to initiate transmission of acoustic bursts, and to collect signal data or other measurement results. The microprocessor in each sensor controller 302 operates in accordance with firmware and stored configuration parameters to parse commands from the ECU and carry out the appropriate operations, including the transmission of acoustic bursts and reception of acoustic signals.

In various implementations, use is made of chirp-modulated signals, for instance a linear frequency modulated ("LFM") chirp. A chirp is a pulse that changes frequency during transmission. An up-chirp is a signal pulse that increases in frequency during transmission, and a down-chirp is a signal pulse that decreases in frequency during transmission. For clarity, the examples used herein will consider a linear increase or decrease, however in various implementations the increase or decrease is not linear. The echo of a chirp may be compressed in a correlator without introducing much or any correlation noise. As such, peak detection of the echo is eased without decreasing time resolution. Additionally, LFM chirps withstand Doppler frequency shift without, or with a minimum of, any increase in correlation noise. LFM chirps can be used as transmit pulses for measuring a distance to an obstacle, or object, situated in the sensing range of a sensor system.

In other implementations, use is made of AM (amplitude-modulated) signals, for instance a shaped pulse of a fixed-frequency carrier. AM signaling mode may enable the use of shorter bursts (e.g., on the order of 200 to 300 microseconds), reducing transmission time and increasing sensitivity to nearby obstacles. Other implementations may employ pulses with modulated carriers, e.g., modulated with binary phase shift keying (BPSK). For sake of clarity, the term "burst" as used herein refers to an AM (fixed frequency), BPSK (modulated), or chirp (swept frequency) pulse, which may be one of a series of bursts created by driving a piezoelectric element or other ultrasonic transducer. Chirp-modulated pulses may have a longer duration than a typical AM pulse, for instance more than 1 millisecond, such as in the range of 2-3 milliseconds. It is noted here that burst lengths can be varied, with shorter bursts being used to facilitate detection of nearby obstacles and longer bursts being used to increase burst energy (and echo energy) for more distant obstacles. Burst lengths for detecting nearby obstacles may be half or perhaps a quarter of the burst lengths used for more distant obstacles. The sensor may be switched between modes for different detection distances.

Although it is deemed particularly useful to systematically vary a characteristic frequency (e.g., the starting frequency or, equivalently, the center or ending frequency) of the chirp-modulated pulses in a series, such frequency variation can also be applied to the carrier frequency of the AM pulses in a series. The frequency variation can be expressed for each pulse as a frequency displacement from a nominal characteristic frequency (e.g., a nominal starting frequency or nominal carrier frequency).

To transmit an acoustic burst, the microprocessor instructs a selected transmitter to drive the output pins for the ultrasonic transducer, which are coupled to a piezoelectric element PZ. A transformer and/or resonance tuning network may be provided for voltage amplification and control of the transducer's resonant frequency. The transmitters may accept a carrier frequency signal from the oscillator with a nominal frequency of, e.g., 50 kHz. The transmitter may use the carrier frequency signal to generate a series of AM (amplitude modulated) or chirp pulses, each pulse corresponding to an acoustic burst. An example of a chirp pulse may be a pulse having a frequency swept upward from 7 kHz below the carrier frequency to 7 kHz above the carrier frequency (up-chirp). A down chirp may alternatively be employed, with the frequency being swept linearly downward rather than upward. In some contemplated implementations, the transmitter provides a custom pattern of frequency offsets to the acoustic bursts to serve as a unique signature for that ultrasonic transducer.

To receive an acoustic signal, the microprocessor instructs one or both ADCs to digitize the electrical receive signal 307 from the MEMS microphone 306 and/or the receive signal 308 from piezoelectric element 304. The digitized signals may be provided directly to the DSP for real time processing or buffered in memory for later processing by the DSP or by the ECU. To reduce IO bandwidth requirements, the DSP may implement data compression to reduce the number of bits needed to represent the ZIF IQ data or to represent the magnitude of the baseband signals. To further reduce bandwidth requirements, the DSP may perform on-chip processing for peak detection and distance estimation. Various suitable processing techniques for detecting reflections of the acoustic burst are known in the art, including co-owned US Patent Publication 2024/0069192 "Motion-compensated distance sensing with concurrent up-chirp down-chirp waveforms", which is hereby incorporated herein by reference.

As the received electrical signals are typically in the millivolt or microvolt range, the receivers $RX_M$, $RX_T$ may include amplifiers to buffer and amplify the signal from the receive terminals. Analog or digital mixers may be included to down convert the receive signals to baseband for further filtering and processing by the DSP. The mixer is in one implementation an in-phase/quadrature (I/Q) digital mixer giving Zero Intermediate Frequency (ZIF) IQ data as its output. (Though the term "ZIF" is used herein, the down converted signal may in practice be a low intermediate frequency or "near-baseband" signal.)

The DSP applies programmable methods to acquire the receive signals and to detect any echoes and measure their parameters such as time-of-flight (ToF), duration, and peak amplitude. Such methods may employ threshold comparisons, minimum intervals, peak detections, zero-crossing detection and counting, noise level determinations, and other customizable techniques tailored for improving reliability and accuracy. Notably, the peak detection process itself has variations, with some variations performing rising edge detection, falling edge detection, or detection of the peak maximum. Processing for nearby obstacle detection may be performed entirely in the controller 302 or may be shared with or delegated to an ECU or host processor, which receives certain data via the communications bus as previously described.

Figure 4:
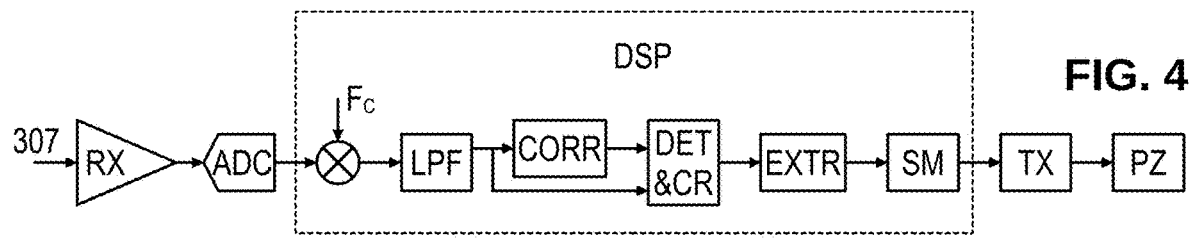
FIG. 4 is a block diagram of an illustrative two-way communication channel.

In addition to the foregoing proximity-sensing operations, the sensor controller 302 can monitor the receive signal 307 for communications from the smart device 106. Such monitoring may be continuous or may be discontinued during proximity sensing operations. Alternatively, such monitoring may be performed for a predetermined time after a trigger event such as, e.g., detection of motion near the vehicle, actuation of a door handle, detection of a knock or slight jarring of the vehicle. The monitoring may be performed using an arrangement such as that shown in FIG. 4.

The amplified receive signal from receiver RX is digitized by an analog to digital converter ADC. The DSP obtains the digitized receive signal from the ADC or from a buffer in memory MEM. The DSP may implement various modules in accordance with instructions retrieved from firmware memory FW, or the modules may be implemented as application-specific integrated circuits. (Alternatively, the modules may be implemented by a field-programmable gate array (FPGA) or other form of a programmable logic device (PLD)). A first module may process the digitized receive signal by digitally mixing it with a carrier frequency signal $f_c$ and low-pass filtering the result to down convert the digitized receive signal. The module is in one implementation an in-phase/quadrature (I/Q) digital mixer giving Zero Intermediate Frequency (ZIF) IQ data as its output. (Though the term "ZIF" is used herein, the down-converted signal may in practice be a low intermediate frequency or "near-baseband" signal.)

A second module may be a correlation filter (CORR) having an impulse response corresponding to a time-reversed preamble or sync word pattern specified by the smart device's communication protocol. Such a filter produces a peak when the preamble or sync word pattern is received. When the correlation filter output exceeds a predetermined threshold, the DSP may enable a subsequent module for symbol detection and clock recovery. The symbol detection and clock recovery module may perform channel equalization to obtain an equalized signal. Symbol detection may be performed by comparing the equalized signal amplitude, phase, frequency, frequency derivative, etc., to various decision thresholds. Symbol clock recovery may be performed by comparing the equalized signal characteristics to target values for the symbol decisions. The sequence of symbol decisions may be supplied to an extraction module (EXTR) that, together with optional descrambling, decoding, and error correction, extracts commands and other message parameter values from each message frame. The DSP may implement a state machine (SM) or other mechanism for processing the received commands and parameter values. Where two-way communication is desired, the state machine module may determine appropriate response or acknowledgement messages and may provide such to a transmitter (TX). The transmitter drives the ultrasonic transducer (PZ) to send the response or acknowledgement message as an ultrasonic or near-ultrasonic signal to the smart device. As previously mentioned, communications with the smart device may occur in a frequency range much lower than the frequency range used for proximity sensing.

Figure 5:
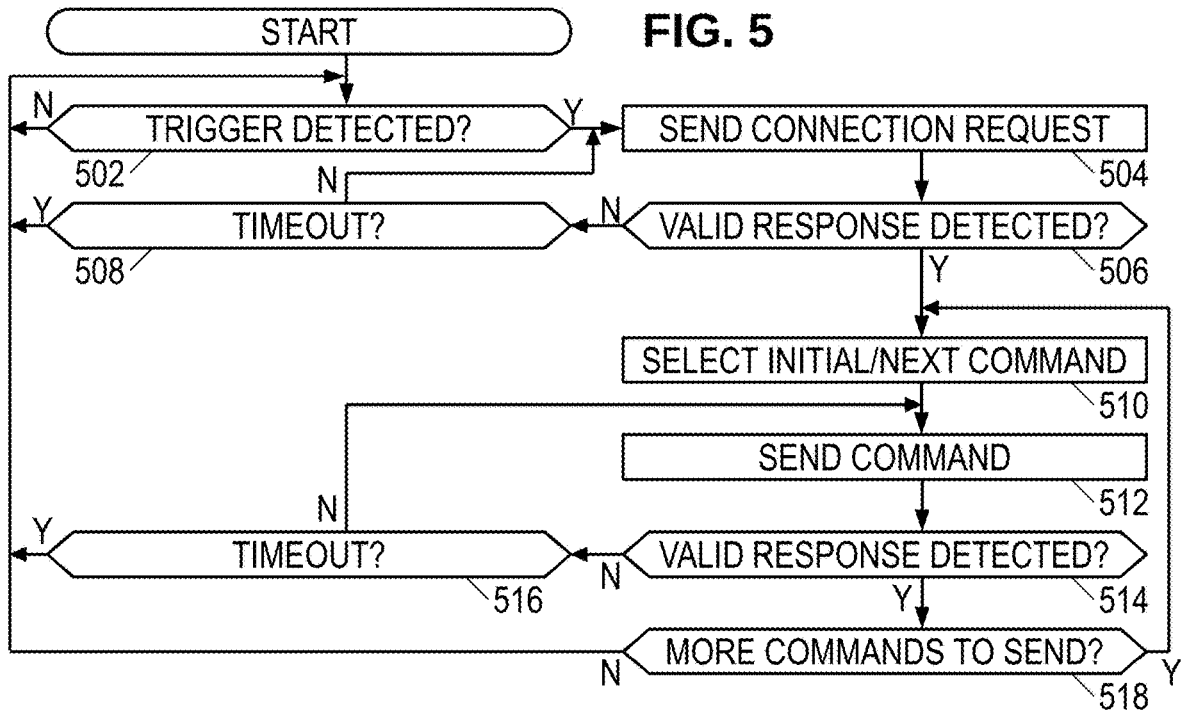
FIG. 5 is a flow diagram of an illustrative close-range communications method that may be implemented by a smart device.

FIG. 5 is a flow diagram of an illustrative close-range communications method that may be implemented by the smart device 106. In block 502, the device determines whether a connection should be attempted. The trigger for a connection attempt may be, e.g., the reception of an acoustic beacon signal from the vehicle, a determination by a navigation or position tracking system that the user has returned to a vehicle's vicinity, an opening or awakening of an app on the device, a physical tap or shake of the device, or a voice command from the user. The device continues in block 502 until a trigger is detected. Once detected, the device generates an acoustic signal containing a connection request in block 504.

The device checks for an acoustic signal containing a response message in block 506. If no valid response message is detected within a predetermined time window, the device checks whether a connection attempt timer has elapsed in block 508. If so, the process returns to block 502 to await another trigger. Otherwise, another connection request message is sent in block 504. Once a valid response message is received in block 506, the device proceeds to block 510.

In block 510, the device may select a command to be sent to the vehicle in block 512. In block 512, the device sends the command as an acoustic signal. In block 514, the device checks for an acoustic signal containing a response message. If no valid response message is detected within a predetermined time window, the device checks whether a command timer has elapsed in block 516. If so, the process returns to block 502 to await another trigger. Otherwise, the command message is retransmitted in block 512. Once a valid response message is received in block 514, the device proceeds to block 518 to determine if more commands are to be sent. If so, the device returns to block 510. Otherwise, the device returns to block 502.

The sequence of commands can vary, but may include, e.g., an unlock command, an engine start command, a climate control ON command, sound system ON command, and a seat reposition command. Isolated commands, such as a side-door open command, trunk open command, hood release command, sound alarm command, or a lock command, are also contemplated. Where supported by the driver assistance system, the commands may include a self-park command, or an auto valet command.

Figure 6:
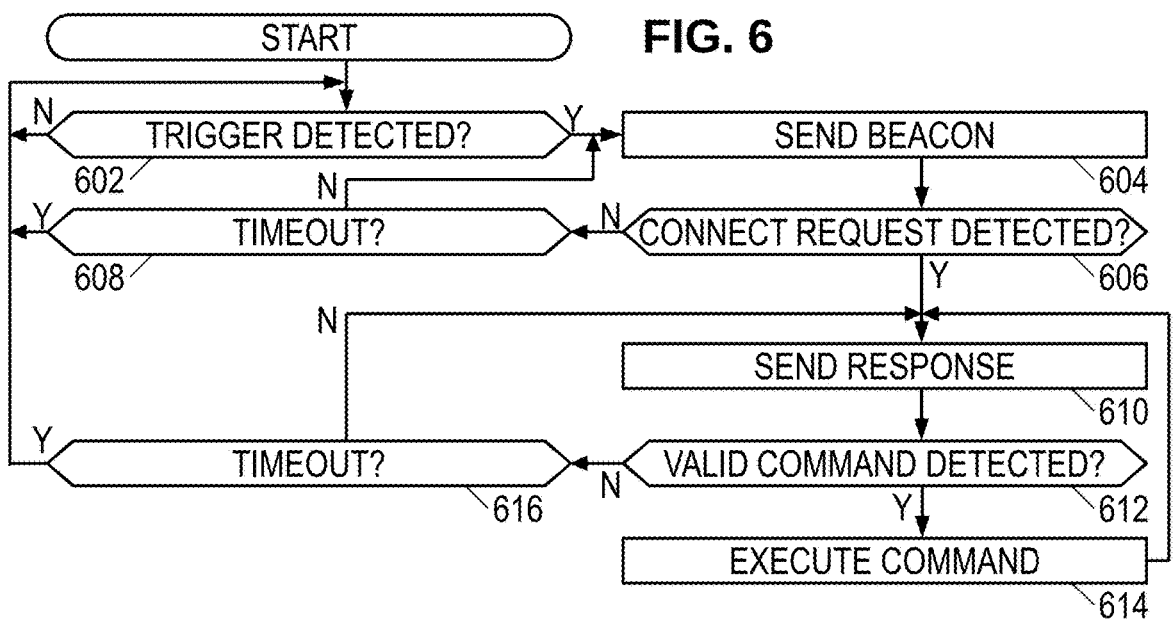
FIG. 6 is a flow diagram of an illustrative close-range communications method that may be implemented by a vehicle.

FIG. 6 is a flow diagram of an illustrative close-range communications method that may be implemented by the vehicle, or more particularly, by one or more of the sensor controllers and/or by the ECU. In block 602, the vehicle determines whether a connection should be attempted. The trigger for a connection attempt may be, e.g., the detection of nearby motion, detection of footsteps or other sounds, the actuation of a door handle (or hood release, trunk latch, or fueling port door), detection of a physical knock on (or kick or jarring of) of the vehicle, detection of a voice command, or detection of a connection request. The vehicle continues in block 602 until a trigger is detected. Once detected, the vehicle generates an acoustic signal containing a beacon in block 604.

The vehicle checks for an acoustic signal containing a connection request message in block 606. If no valid request message is detected within a predetermined time window, the vehicle checks whether a connection attempt timer has elapsed in block 608. If so, the process returns to block 602 to await another trigger. Otherwise, another beacon message is sent in block 604. Once a valid request message is received in block 606, the vehicle proceeds to block 610.

In block 610, the vehicle may send a response message to the device. The response message may include the result of a previously transmitted command, or other information. For example, the response message may include vehicle status information such as whether the vehicle is actively charging/fueling, the level of charge/fuel, the interior temperature, tire pressures, odometer readings, service alerts. Other potential information includes vehicle owner or registration information, parking pass information, valet assigned ticket information. Such information may be provided by default or in response to an information request command.

After sending the response message in block 610, the vehicle may check for an acoustic signal containing another command message in block 612. If a valid command message is received, the vehicle may attempt to execute the command in block 614, after which the process moves to block 610 to communicate a response message acknowledging the command and communicating the results, e.g., whether the command was successfully performed. If no valid command message is detected within a predetermined time window, the vehicle checks whether a command timer has elapsed in block 616. If so, the process returns to block 602 to await another trigger. Otherwise, the previous response message is retransmitted in block 610.

Potential advantages of the above-described arrangement include the ability to readily transfer or share authorized access to a vehicle without needing to deliver or duplicate a physical key. Likelihood of a lost key may be reduced particularly with use of regular backups of the smart device, and access from stolen smart devices may be readily revoked and transferred to replacement devices. Use of a smart device may enable features such as voice command-based access, alerts regarding left-behind vehicle occupants, and access to internet-facilitated services including parking facilities, rental services, etc.

The expected range for acoustic signals from typical smart devices is limited to less than, say, 3 meters. Out-of-band operation for the ultrasonic transducers' responses may be similarly limited, or in some cases, range limitations may be enforced using proximity sensing measurements or source triangulation to determine the user's position. Such close-range limitations is expected to prove advantageous in terms of security against interception or so-called "man in the middle" attacks.

The foregoing discussion has focused on communications between a smart device and a vehicle. We note here that the vehicle's array of ultrasonic proximity sensors also enables communications with other vehicles and with infrastructure sensors such as ultrasonic zone/occupancy sensors used to detect when a vehicle is occupying a parking spot in a parking garage. Similar sensors are used to detect when a vehicle is positioned in front of, e.g., a fueling/charging station or an entry/exit barrier. Such communications may occur at higher frequencies where the infrastructure sensors are designed to operate, e.g., 30 kHz to 90 kHz, but otherwise the communication process may be similar to that described previously.

Vehicle-to-infrastructure communications may facilitate parking or fueling services by automating the information exchange associated with such transactions. Other services may also be enabled, such as enabling a large parking garage to quickly determine the location of a given vehicle. For self-driving vehicles, the infrastructure may relay commands to a chosen vehicle to travel to the building entrance or some other chosen location. For buildings or other infrastructures with existing sensor arrays, such services may be introduced at essentially no additional cost.

The invention claimed is:

1. A vehicle that comprises:
   one or more ultrasonic sensors configured for proximity sensing; and
   a controller configured to use the one or more ultrasonic sensors to detect parking obstacles, and further configured use the one or more ultrasonic sensors to receive an acoustic signal from a smart device, wherein the controller is further configured to use multiple ones of the one or more ultrasonic sensors to steer a transmitted acoustic signal to the smart device.

2. The vehicle of claim 1, wherein the acoustic signal comprises at least one of: a lock command, an unlock command, and an alarm command.

3. The vehicle of claim 1, wherein the acoustic signal is in a frequency range between 18 kHz and 25 kHz, inclusive.

4. The vehicle of claim 1, wherein the acoustic signal is in a frequency range between 20 KHz and 23 kHz, inclusive.

5. The vehicle of claim 1, wherein each of the one or more ultrasonic sensors includes a MEMS (micro-electromechanical systems) microphone.

6. The vehicle of claim 1, wherein the smart device is a smart phone.

7. The vehicle of claim 1, wherein the controller is further configured to use the one or more ultrasonic sensors to transmit a second acoustic signal to the smart device, the acoustic signal and the second acoustic signal providing a two-way communication channel between the vehicle and the smart device.

8. A method of operating an advanced driver-assistance system (ADAS), the method comprising:
   performing, via an ultrasonic proximity sensor of the ADAS, an ultrasonic proximity measurement using a first frequency range; and
   communicating, via the ultrasonic proximity sensor, with a smart device using a second frequency range that is lower than the first frequency range,
   wherein said communicating uses multiple ultrasonic proximity sensors to steer a transmitted acoustic signal to the smart device.

9. The method of claim 8, wherein the second frequency range resides within a band between 20 KHz and 23 kHz, inclusive.

10. The method of claim 8, wherein said communication includes receiving at least one of: a lock command, an unlock command, and an alarm command.

* * * * *